United States Patent
Aoki et al.

(10) Patent No.: US 12,362,358 B2
(45) Date of Patent: Jul. 15, 2025

(54) POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY

(71) Applicant: Panasonic Intellectual Property Management Co., Ltd., Osaka (JP)

(72) Inventors: Yoshinori Aoki, Osaka (JP); Masakazu Togo, Osaka (JP); Takeshi Ogasawara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 563 days.

(21) Appl. No.: 17/762,528

(22) PCT Filed: Jul. 28, 2020

(86) PCT No.: PCT/JP2020/028827
§ 371 (c)(1),
(2) Date: Mar. 22, 2022

(87) PCT Pub. No.: WO2021/059728
PCT Pub. Date: Apr. 1, 2021

(65) Prior Publication Data
US 2022/0384805 A1   Dec. 1, 2022

(30) Foreign Application Priority Data
Sep. 27, 2019   (JP) .................................. 2019-177465

(51) Int. Cl.
*H01M 4/525*   (2010.01)
*C01G 53/00*   (2025.01)
(Continued)

(52) U.S. Cl.
CPC ............ *H01M 4/525* (2013.01); *C01G 53/42* (2013.01); *C01G 53/66* (2013.01); *H01M 4/131* (2013.01);
(Continued)

(58) Field of Classification Search
None
See application file for complete search history.

(56) References Cited

U.S. PATENT DOCUMENTS

| | | |
|---|---|---|
| 2003/0031930 A1 | 2/2003 | Hamano et al. |
| 2004/0161668 A1 | 8/2004 | Maeda et al. |

(Continued)

FOREIGN PATENT DOCUMENTS

| | | |
|---|---|---|
| CN | 101120464 A | 2/2008 |
| EP | 1422199 B1 | 1/2009 |

(Continued)

OTHER PUBLICATIONS

Machine English translation of JP2012252807A from Espacenet published to Nagai Dec. 20, 2012 (Year: 2012).*

(Continued)

*Primary Examiner* — Ula C Ruddock
*Assistant Examiner* — Mary Grace Byram
(74) *Attorney, Agent, or Firm* — WHDA, LLP

(57) ABSTRACT

A positive electrode active material for a non-aqueous electrolyte secondary battery, according to an example of this embodiment, includes a lithium transition metal composite oxide which has a layered structure and contains at least Ni, Al, and Ca. The lithium transition metal composite oxide has a Ni content of 85-95 mol %, an Al content of at most 8 mol %, and a Ca content of at most 2 mol % with respect to the total amount of metal elements other than Li. In addition, the proportion of metal elements other than Li present in a Li layer is 0.6-2.0 mol % with respect to the total (Continued)

amount of metal elements other than Li contained in the composite oxide.

7 Claims, 2 Drawing Sheets

(51) Int. Cl.
| | | |
|---|---|---|
| *C01G 53/42* | (2025.01) | |
| *C01G 53/66* | (2025.01) | |
| *H01M 4/131* | (2010.01) | |
| *H01M 4/36* | (2006.01) | |
| *H01M 4/485* | (2010.01) | |
| *H01M 4/505* | (2010.01) | |
| *H01M 10/052* | (2010.01) | |
| *H01M 10/0525* | (2010.01) | |
| *H01M 4/02* | (2006.01) | |

(52) U.S. Cl.
CPC ............ *H01M 4/36* (2013.01); *H01M 4/364* (2013.01); *H01M 4/366* (2013.01); *H01M 4/485* (2013.01); *H01M 4/505* (2013.01); *H01M 10/052* (2013.01); *H01M 10/0525* (2013.01); *C01P 2002/52* (2013.01); *C01P 2002/60* (2013.01); *C01P 2002/72* (2013.01); *C01P 2002/77* (2013.01); *C01P 2004/84* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 2009/0035659 A1 | 2/2009 | Takeuchi et al. | |
| 2009/0104529 A1* | 4/2009 | Nishino | H01M 10/0525 429/231.95 |
| 2017/0237069 A1* | 8/2017 | Takamori | C01G 53/50 429/223 |
| 2019/0190018 A1* | 6/2019 | Aoki | H01M 4/366 |
| 2020/0358094 A1* | 11/2020 | Oshita | C01B 35/04 |
| 2020/0395611 A1 | 12/2020 | Aoki et al. | |

FOREIGN PATENT DOCUMENTS

| | | | |
|---|---|---|---|
| JP | 2003-100295 A | 4/2003 | |
| JP | 2003-261334 A | 9/2003 | |
| JP | 2004-171961 A | 6/2004 | |
| JP | 2006-310181 A | 11/2006 | |
| JP | 2012-252807 A | 12/2012 | |
| JP | 2018-129221 A | 8/2018 | |
| WO | WO-2018043190 A1 * | 3/2018 | ........ H01M 10/0525 |
| WO | 2019/131234 A1 | 7/2019 | |

OTHER PUBLICATIONS

Chen Minmin et al: "Decreasing Li/Ni Disorder and Improving the Electrochemical Performances of Ni-Rich LiNi 0.8 Co 0.1 Mn0 .1 O 2 by Ca Doping", Inorganic Chemistry, vol. 56, No. 14, Jun. 26, 2017 (Jun. 26, 2017), pp. 8355-8362, XP055970797; Cited in Extended European Search Report dated Oct. 25, 2022. (8 pages).
Guilmard M. et al: "Structural and electrochemical properties of LiNi0.70Co0.15Al0.15O2", Solid State Ionics, North Holland Pub. Company. Amsterdam; NL, NL, vol. 160, No. 1-2, May 1, 2003 (May 1, 2003), pp. 39-50, XP004430496; Cited in Extended European Search Report dated Oct. 25, 2022. (12 pages).
The Extended European Search Report dated Oct. 25, 2022, issued in counterpart EP Application No. 20867359.0. (6 pages).
Office Action dated Dec. 7, 2023, issued in counterpart CN Application No. 202080066515.5, with partial English translation. (13 pages).
International Search Report dated Oct. 13, 2020, issued in counterpart International Application No. PCT/JP2020/028827 (2 pages).

* cited by examiner

POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2020/028827 filed on Jul. 28, 2020 which claims the benefit of priorities under 35 U.S.C. $119 (a) of Japanese Patent Application No. 2019-177465 filed in Japan on Sep. 27, 2019, the contents of which are incorporated herein by reference.

TECHNICAL FIELD

The present disclosure generally relates to a positive electrode active material for a non-aqueous electrolyte secondary battery and a non-aqueous electrolyte secondary battery, and more particularly to a positive electrode active material including a lithium-transition metal composite oxide with a high Ni content and a non-aqueous electrolyte secondary battery using the active material.

BACKGROUND ART

In recent years, a lithium-transition metal composite oxide with a high Ni content has attracted attention as a positive electrode active material with a high energy density. For example, Patent Literature 1 discloses a positive electrode active material for a non-aqueous electrolyte secondary battery, comprising a lithium-transition metal composite oxide represented by the general formula $Li_xNi_yCo_zM_mO_2$, wherein M is an element selected from the group consisting of Ba, Sr, and B, $0.9 \leq x \leq 1.1$, $0.5 \leq y \leq 0.95$, $0.05 \leq z \leq 0.5$, and $0.0005 \leq m \leq 0.02$, and having a BET specific surface area of 0.8 m²/g or less.

Patent Literature 2 discloses a positive electrode active material for a non-aqueous electrolyte secondary battery having an α-NaFeO₂ structure and including one or two or more transition metal elements selected from the group consisting of Mn, Ni, and Co, wherein an alkaline earth metal and W are present on a particle surface of a lithium-transition metal composite oxide.

CITATION LIST

Patent Literature

PATENT LITERATURE 1: Japanese Unexamined Patent Application Publication No. 2003-100295
PATENT LITERATURE 2: Japanese Unexamined Patent Application Publication No: 2018-129221

SUMMARY

When a lithium-transition metal composite oxide with a high Ni content is used for a positive electrode active material of a non-aqueous electrolyte secondary battery, a large amount of Li is extracted during charge, which collapses the layered crystal structure with repeated charges and discharges, leading to a problem of lowering the capacity. The art disclosed in Patent Literatures 1 and 2 still has a room for improvement in charge-discharge cycle characteristics.

A positive electrode active material for a non-aqueous electrolyte secondary battery of an aspect of the present disclosure includes a lithium-transition metal composite oxide having a layered structure and containing at least Ni, Al, and Ca, wherein in the lithium-transition metal composite oxide, a content of Ni is 85 to 95 mol % based on a total number of moles of metal elements excluding Li, a content of Al is 8 mol % or less based on the total number of moles of metal elements excluding Li, a content of Ca is 2 mol % or less based on the total number of moles of metal elements excluding Li, and a proportion of metal elements other than Li present in a Li layer is 0.6 to 2.0 mol % based on a total number of moles of metal elements excluding Li contained in the composite oxide.

A non-aqueous electrolyte secondary battery of an aspect of the present disclosure comprises: a positive electrode including the positive electrode active material; a negative electrode; and a non-aqueous electrolyte.

An aspect of the present disclosure may provide a positive electrode active material for a non-aqueous electrolyte secondary battery including a lithium-transition metal composite oxide with a high Ni content, the positive electrode active material contributing to improvement in charge-discharge cycle characteristics of the battery. A non-aqueous electrolyte secondary battery using the positive electrode active material according to the present disclosure has excellent charge-discharge cycle characteristics.

DESCRIPTION OF EMBODIMENTS

When a lithium-transition metal composite oxide with a high Ni content is used as a positive electrode active material of a non-aqueous electrolyte secondary battery, a large amount of Li is extracted from the composite oxide during charge, which collapses the layered structure of the composite oxide with repeated charges and discharges, leading to lowering of a battery capacity, as mentioned above. In addition, such a composite oxide has a highly active particle surface and a more unstable structure of the particle surface, and thereby an erosion of the layered structure easily proceeds particularly from the particle surface.

The present inventors have made intensive investigation to solve the problem, and as a result, have found that adding a predetermined amount of Ca in addition to a predetermined amount of Al into a lithium-transition metal composite oxide and substituting some Li in a Li layer with other metal elements specifically improve the cycle characteristics. A main cause of such an exerted effect is considered to be a stabilized structure of the Li layer by substitution with the other metal elements in the Li layer, a stabilized transition metal layer by substitution with Al in the transition metal layer, and a modified and stabilized structure of the particle surface by addition of Ca, resulting in inhibition of the erosion from the particle surface. That is, it is considered that the stabilization of the Li layer, the stabilization of the transition metal layer, and the stabilization of the particle surface structure generate a specific synergistic effect to remarkably improve the cycle characteristics.

The description "a numerical value (A) to a numerical value (B)" herein means the numerical value (A) or more and the numerical value (B) or less.

Hereinafter, an example of an embodiment of the positive electrode active material for a non-aqueous electrolyte secondary battery according to the present disclosure and a non-aqueous electrolyte secondary battery using the active material will be described in detail. Hereinafter, a cylindrical battery in which a wound electrode assembly 14 is housed in a bottomed cylindrical exterior housing can 16 will be exemplified, but an exterior housing body is not limited to a cylindrical exterior housing can and may be, for example, a rectangular exterior housing can and may be an exterior housing body constituted of laminated sheets including a metal layer and a resin layer. The electrode assembly may be a stacked electrode assembly in which a plurality of positive electrodes and a plurality of negative electrodes are alternatively stacked with separators interposed therebetween.

Figure 1:
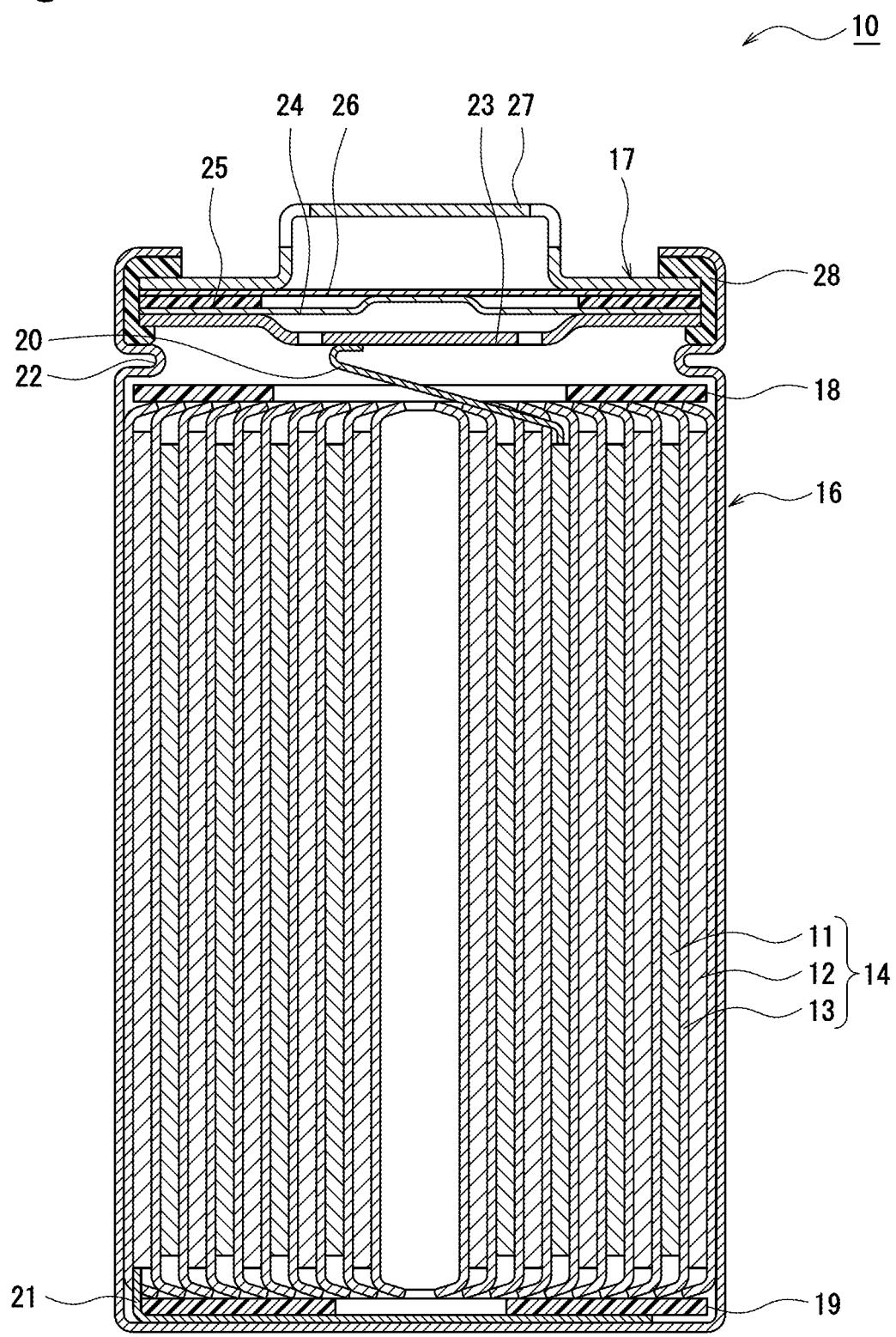
FIG. 1 is a sectional view of a non-aqueous electrolyte secondary battery of an example of an embodiment.

FIG. 1 is a sectional view of a non-aqueous electrolyte secondary battery 10 of an example of an embodiment. As exemplified in FIG. 1, the non-aqueous electrolyte secondary battery 10 comprises the wound electrode assembly 14, a non-aqueous electrolyte, and the exterior housing can 16 housing the electrode assembly 14 and the non-aqueous electrolyte. The electrode assembly 14 has a positive electrode 11, a negative electrode 12, and a separator 13, and has a wound structure in which the positive electrode 11 and the negative electrode 12 are spirally wound with the separator 13 interposed therebetween. The exterior housing can 16 is a bottomed cylindrical metallic container having an opening at one side in an axial direction, and the opening of the exterior housing can 16 is sealed with a sealing assembly 17. Hereinafter, for convenience of description, the sealing assembly 17 side of the battery will be described as the upper side, and the bottom side of the exterior housing can 16 will be described as the lower side.

The non-aqueous electrolyte includes a non-aqueous solvent and an electrolyte salt dissolved in the non-aqueous solvent. For the non-aqueous solvent, esters, ethers, nitriles, amides, a mixed solvent of two or more thereof, and the like are used, for example. The non-aqueous solvent may contain a halogen-substituted solvent in which at least some hydrogens in these solvents are substituted with halogen atoms such as fluorine. For the electrolyte salt, a lithium salt such as $LiPF_6$ is used, for example. The electrolyte is not limited to a liquid electrolyte, and may be a solid electrolyte using a gel polymer or the like.

Any of the positive electrode 11, negative electrode 12, and separator 13 constituting the electrode assembly 14 is a band-shaped elongated body, and spirally wound to be alternatively stacked in a radial direction of the electrode assembly 14. To prevent precipitation of lithium, the negative electrode 12 is formed to be one size larger than the positive electrode 11. That is, the negative electrode 12 is formed to be longer than the positive electrode 11 in a longitudinal direction and a width direction (short direction). Two separators 13 are formed to be one size larger than at least the positive electrode 11, and disposed to, for example, sandwich the positive electrode 11. The electrode assembly 14 has a positive electrode lead 20 connected to the positive electrode 11 by welding or the like and a negative electrode lead 21 connected to the negative electrode 12 by welding or the like.

Insulating plates 18 and 19 are disposed on the upper and lower sides of the electrode assembly 14, respectively. In the example illustrated in FIG. 1, the positive electrode lead 20 extends through a through hole in the insulating plate 18 toward a side of the sealing assembly 17, and the negative electrode lead 21 extends through an outside of the insulating plate 19 toward the bottom side of the exterior housing can 16. The positive electrode lead 20 is connected to a lower surface of an internal terminal plate 23 of the sealing assembly 17 by welding or the like, and a cap 27, which is a top plate of the sealing assembly 17 electrically connected to the internal terminal plate 23, becomes a positive electrode terminal. The negative electrode lead 21 is connected to a bottom inner surface of the exterior housing can 16 by welding or the like, and the exterior housing can 16 becomes a negative electrode terminal.

A gasket 28 is provided between the exterior housing can 16 and the sealing assembly 17 to achieve sealability inside the battery. On the exterior housing can 16, a grooved part 22 in which a part of a side part thereof projects inside for supporting the sealing assembly 17 is formed. The grooved part 22 is preferably formed in a circular shape along a circumferential direction of the exterior housing can 16, and supports the sealing assembly 17 with the upper surface thereof. The sealing assembly 17 is fixed on the upper part of the exterior housing can 16 with the grooved part 22 and with an end part of the opening of the exterior housing can 16 calked to the sealing assembly 17.

The sealing assembly 17 has a stacked structure of the internal terminal plate 23, a lower vent member 24, an insulating member 25, an upper vent member 26, and the cap 27 in this order from the electrode assembly 14 side. Each member constituting the sealing assembly 17 has, for example, a disk shape or a ring shape, and each member except for the insulating member 25 is electrically connected each other. The lower vent member 24 and the upper vent member 26 are connected at each of central parts thereof, and the insulating member 25 is interposed between each of the circumferential parts of the vent members 24 and 26. If the internal pressure of the battery increases due to abnormal heat generation, the lower vent member 24 is deformed so as to push the upper vent member 26 up toward the cap 27 side and breaks, and thereby a current pathway between the lower vent member 24 and the upper vent member 26 is cut off. If the internal pressure further increases, the upper vent member 26 breaks, and gas is discharged through the cap 27 opening.

Hereinafter, the positive electrode 11, negative electrode 12, and separator 13, which constitute the electrode assembly 14, and particularly a positive electrode active material constituting the positive electrode 11 will be described in detail.

[Positive Electrode]

The positive electrode 11 has a positive electrode core and a positive electrode mixture layer provided on a surface of the positive electrode core. For the positive electrode core, a foil of a metal stable within a potential range of the positive electrode 11, such as aluminum, a film in which such a metal is disposed on a surface layer thereof, and the like may be used. The positive electrode mixture layer includes a positive electrode active material, a binder, and a conductive agent, and is preferably provided on both surfaces of the positive electrode core except for a portion to which the positive electrode lead 20 is connected. The positive electrode 11 may be produced by, for example, applying a positive electrode mixture slurry including the positive electrode active material, the binder, the conductive agent, and the like on the surface of the positive electrode core, drying and subsequently compressing the applied film to form the positive electrode mixture layers on both the surfaces of the positive electrode core.

Examples of the conductive agent included in the positive electrode mixture layer may include a carbon material such as carbon black, acetylene black, Ketjenblack, and graphite. Examples of the binder included in the positive electrode mixture layer may include a fluororesin such as polytetrafluoroethylene (PTFE) and polyvinylidene fluoride (PVdF), polyacrylonitrile (PAN), a polyimide, an acrylic resin, and a polyolefin. With these resins, a cellulose derivative such as carboxymethyl cellulose (CMC) or a salt thereof, polyethylene oxide (PEO), and the like may be used in combination.

The positive electrode active material includes a lithium-transition metal composite oxide having a layered structure and containing at least Ni, Al, and Ca. For example, Ca is present as a compound on a particle surface or in a layered structure of the composite oxide. Hereinafter, for convenience of description, the lithium-transition metal composite oxide is referred to as "composite oxide (Z)". The composite oxide (Z) has, for example, a layered structure belonging to the space group R-3m or a layered structure belonging to the space group C2/m. The positive electrode active material is mainly composed of the composite oxide (Z), and may be composed of substantially only the composite oxide (Z). The positive electrode active material may include a composite oxide other than the composite oxide (Z) or another compound within a range in that an object of the present disclosure is not impaired.

The composite oxide (Z) is, for example, of secondary particles formed by aggregating primary particles. A particle diameter of the primary particles is typically 0.05 μm to 1 μm. A median diameter (D50) on a volumetric basis of the composite oxide (Z) is, for example, 3 μm to 30 μm, and preferably 5 μm to 25 μm. The D50 on a volumetric basis, also referred to as a median diameter, means a particle diameter at which a cumulative frequency is 50% from a smaller particle diameter side in a particle size distribution on a volumetric basis. The particle size distribution of the composite oxide (Z) may be measured by using a laser diffraction-type particle size distribution measuring device (for example, MT3000II, manufactured by MicrotracBEL Corp.) with water as a dispersion medium.

The composite oxide (Z) contains 85 to 95 mol % of Ni based on a total number of moles of metal elements excluding Li. With the content of Ni of 85 mol % or more, the battery with a high energy density may be obtained. Meanwhile, with the content of Ni of more than 95 mol %, the contents of Al and Ca are too low to achieve the stability of the layered structure of the composite oxide (Z) and to inhibit the erosion of the particle surface. A lower limit of the content of Ni may be 90 mol % based on the total number of moles of metal elements excluding Li.

Contents of the elements constituting the composite oxide (Z) may be measured with an inductively coupled plasma atomic emission spectroscopy analyzer (ICP-AES), an electron probe micro analyzer (EPMA), an energy dispersive X-ray analyzer (EDX), or the like.

In the composite oxide (Z), the content of Ni is 85 to 95 mol % based on the total number of moles of metal elements excluding Li, as mentioned above. The content of Al is 8 mol % or less based on the total number of moles of metal elements excluding Li. The content of Al may be 7 mol % or less, or may be 6 mol % or less. From the viewpoint of the stability of the layered structure of the composite oxide (Z), the lower limit of the content of Al is preferably 1 mol %, and more preferably 2 mol %. A preferable example of the range of the content of Al is 2 to 6 mol % or 3 to 5 mol %.

The content of Ca in the composite oxide (Z) is 2 mol % or less, preferably 1.7 mol % or less, and particularly preferably 1.5 mol % or less, based on the total number of moles of metal elements excluding Li. It is considered that Ca modifies the particle surface of the composite oxide (Z), and has the effect of inhibiting the erosion of the particle surface. Thus, the cycle characteristics of the battery may be improved as long as the composite oxide (Z) contains Ca; however, the content of Ca is preferably 0.05 mol % or more. In this case, the effect of improving the cycle characteristics appears more obviously. With the content of Ca of more than 2 mol %, resistance increases to lower the charge capacity.

Ca is preferably present on and near the particle surface, for example, in a near surface region within 30 nm from the particle surface, of the composite oxide (Z). Since the composite oxide (Z) is typically of secondary particles formed by aggregation of a plurality of primary particles, Ca is preferably present on a surface of the primary particles including a surface of the secondary particles and near a surface of the primary particles at a higher concentration than a central part of the primary particles. In other words, Ca is unevenly present on and near the surface of the primary particles of the composite oxide (Z), and the content rate of Ca per unit volume is higher on the surface of the primary particles than inside thereof. The distribution of Ca in the composite oxide (Z) may be analyzed with TEM-EDX and the like.

The composite oxide (Z) preferably contains at least one metal element selected from the group consisting of Co, Mn, Fe, Ti, Si, Nb, Zr, Mo, and Zn at an amount of 15 mol % or less based on a total number of moles of metal elements excluding Li. Among them, at least one of Co and Mn is preferably contained. The composite oxide (Z) may contain at least one of Co and Mn, and may contain at least one metal element selected from the group consisting of Fe, Ti, Si, Nb, Zr, Mo, and Zn.

When the composite oxide (Z) contains Co, the content of Co is preferably 10 mol % or less based on the total number of moles of metal elements excluding Li. Since Co is expensive, it is preferable that the amount of Co used is small. The composite oxide (Z) may contain 5 mol % or less of Co based on the total number of moles of metal elements excluding Li, or may contain substantially no Co. The description "contain substantially no Co" means a case where Co is absolutely not contained and a case where Co is mixed as an impurity (a case where an amount of Co that cannot be precisely quantified is mixed). When the composite oxide (Z) contains Mn, the content of Mn is preferably 10 mol % or less based on a total number of moles of metal elements excluding Li.

A preferable example of the composite oxide (Z) is a composite oxide represented by the general formula $Li_aNi_bCo_cAl_dMn_eCa_fM_gO_h$, wherein $0.8 \leq a \leq 1.2$, $0.85 \leq b \leq 0.95$, $0 \leq c \leq 0.06$, $0 < d \leq 0.08$, $0 \leq e \leq 0.10$, $0 < f \leq 0.02$, $0 \leq g \leq 0.10$, $1 \leq h \leq 2$, $b+c+d+e+f+g=1$, and M is at least one selected from the group consisting of Fe, Ti, Si, Nb, Zr, Mo, and Zn.

The composite oxide (Z) has a layered crystal structure in that the Li layer and the transition metal layer are alternately stacked. The Li layer of the composite oxide (Z) contains metal elements other than Li. The proportion of the metal elements other than Li present in the Li layer is 0.6 to 2.0 mol %, preferably 0.7 to 1.9%, and more preferably 0.8 to 1.8%, based on the total number of moles of metal elements excluding Li contained in the composite oxide (Z).

Containing the metal elements other than Li in the Li layer of the composite oxide (Z) at the above proportion, a structure of the Li layer in a state where Li ions are extracted during charge is stabilized to improve the cycle characteristics. Meanwhile, with the proportion of less than 0.6 mol % or more than 2.0 mol %, the effect of improving the cycle characteristics is not obtained. The metal elements other than Li in the Li layer is considered to be mainly Ni, but another metal element may be included. The proportion of the metal elements other than Li present in the Li layer is determined by Rietveld analysis of an X-ray diffraction pattern obtained by X-ray diffraction measurement of the composite oxide (Z), described below in detail.

The composite oxide (Z) preferably has a crystallite size S of 400 to 800 Å, the crystallite size S being calculated with the Scherrer equation from a half-value width of a diffraction peak of a (104) surface in an X-ray diffraction pattern obtained by X-ray diffraction measurement. When the crystallite size S of the composite oxide (Z) is smaller than 400 Å, the crystallinity may decrease to deteriorate the cycle characteristics compared with the case satisfying the above range. Meanwhile, when the crystallite size S is longer than 800 Å, the dispersity of Li may decrease to lower output characteristics of the battery compared with the case satisfying the above range.

The Scherrer equation is represented as follows.

$$S = K\lambda / B \cos \theta$$

In the equation, λ represents a wavelength of the X-ray, B represents a half-value width of a diffraction peak of a (104) surface, θ represents a diffraction angle (rad), and K represents the Scherrer constant. In the present embodiment, K is 0.9. The X-ray diffraction measurement to obtain the X-ray diffraction pattern of the composite oxide (Z) will be described below in detail.

The composite oxide (Z) preferably has a lattice constant a indicating an a-axis length of the crystal structure of 2.870 Å≤a≤2.877 Å and a lattice constant c indicating a c-axis length of 14.18 Å≤c≤14.21 Å, based on the analysis of the X-ray diffraction pattern.

When the lattice constant a is shorter than 2.870 Å, an interatomic distance in the crystal structure is shortened to destabilize the structure, and a reaction resistance of the battery may increase compared with the case satisfying the above range. Meanwhile, when the lattice constant a is longer than 2.877 Å, the interatomic distance in the crystal structure is lengthened to destabilize the structure, and the output characteristics of the battery may be lowered compared with the case satisfying the above range. When the lattice constant c is shorter than 14.18 Å, an interatomic distance in the crystal structure is shortened to destabilize the structure, and a reaction resistance of the battery may increase compared with the case satisfying the above range. Meanwhile, when the lattice constant c is longer than 14.21 Å, the interatomic distance in the crystal structure is lengthened to destabilize the structure, and the output characteristics of the battery may be lowered compared with the case satisfying the above range.

The X-ray diffraction pattern of the composite oxide (Z) preferably has no peak derived from calcium oxide (CaO). The X-ray diffraction pattern is obtained by X-ray diffraction measurement described in Examples below. CaO contained at a degree that is detected with the X-ray diffraction measurement may lower a charge-discharge capacity or the like.

A method of manufacturing the composite oxide (Z) comprises: a first step of obtaining a metal composite oxide including Ni, Al, and an optional metal element; a second step of obtaining a mixture by mixing the metal composite oxide obtained in the first step and a lithium compound and a calcium compound; and a third step of calcining the mixture, for example. The proportion of the metal elements other than Li in the Li layer of the layered structure of the finally obtained composite oxide (Z) is adjusted by, for example, controlling a mixing ratio of the raw materials in the second step, the calcining temperature and calcination time in the third step, and the like.

In the first step, for example, with stirring a solution of metal salts including Ni, Al, and the optional metal element (such as Co, Mn, and Fe), a solution of an alkali such as sodium hydroxide is added dropwise for adjusting a pH on the alkali side (for example, 8.5 to 12.5) to precipitate (coprecipitate) a metal composite hydroxide including Ni, Al, and the optional metal element. Then, the metal composite hydroxide is calcined to obtain the metal composite oxide including Ni, Al, and the optional metal element. The calcining temperature is not particularly limited, and for example, 300° C. to 600° C.

In the second step, the metal composite oxide obtained in the first step, the lithium compound, and a calcium compound are mixed to obtain the mixture. Examples of the lithium compound include $Li_2CO_3$, LiOH, $Li_2O_2$, $Li_2O$, $LiNO_3$, $LiNO_2$, $Li_2SO_4$, $LiOH \cdot H_2O$, LiH, and LiF. Examples of the calcium compound include $Ca(OH)_2$, CaO, $CaCO_3$, $CaSO_4$, and $Ca(NO_3)_2$. A mixing ratio of the metal composite oxide obtained in the first step and the Li compound is preferably regulated so that a molar ratio of the metal element excluding Li:Li is within a range of 1:0.98 to 1:1.1, for example.

In the third step, the mixture obtained in the second step is calcined at the predetermined temperature and in the predetermined time to obtain the composite oxide (Z). The third step is, for example, a multi-stage calcining step including: a first calcining step of calcining the mixture under an oxygen flow to a first set temperature, which is 450° C. to 680° C., at a first heating rate; and a second calcining step of calcining the calcined product obtained in the first calcining step under an oxygen flow to a second set temperature, which is higher than 680° C. and 800° C. or lower, at a second heating rate. The calcination is performed, for example, in an oxygen flow with an oxygen concentration of 60% or higher, and with a flow rate of the oxygen flow of 0.2 mL/min to 4 mL/min per 10 cm³ of a calcination furnace and 0.3 L/min or higher per 1 kg of the mixture.

Here, the first heating rate is set to one or more patterns within a range of 1.5° C./min to 5.5° C./min, and the second heating rate, which is lower than the first heating rate, is set to one or more patterns within a range of 0.1° C./min to 3.5° C./min. Such a multi-stage calcination may adjust the proportion of the metal elements other than Li present in the Li layer within 0.6 to 2.0 mol % in a layered structure of the finally obtained composite oxide (Z).

A holding time at the first set temperature in the first calcining step is preferably 5 hours or shorter, and more preferably 3 hours or shorter. The holding time at the first set temperature is referred to a time of maintaining the first set temperature after the temperature reaches the first set temperature. A holding time at the second set temperature in the second calcining step is preferably 1 to 10 hours, and more preferably 1 to 5 hours. The holding time at the second set temperature is referred to a time of maintaining the second set temperature after the temperature reaches the second set temperature.

[Negative Electrode]

The negative electrode 12 has a negative electrode core and a negative electrode mixture layer provided on a surface of the negative electrode core. For the negative electrode core, a foil of a metal stable within a potential range of the negative electrode 12, such as copper, a film in which such a metal is disposed on a surface layer thereof, and the like may be used. The negative electrode mixture layer includes a negative electrode active material and a binder, and is preferably provided on, for example, both surfaces of the negative electrode core except for a portion to which the negative electrode lead 21 is connected. The negative electrode 12 may be produced by, for example, applying a negative electrode mixture slurry including the negative electrode active material, the binder, and the like on the surface of the negative electrode core, drying and subsequently compressing the applied film to form the negative electrode mixture layers on both the surfaces of the negative electrode core.

The negative electrode mixture layer includes, for example, a carbon-based active material to reversibly occlude and release lithium ions, as the negative electrode active material. The carbon-based active material is preferably a graphite such as: a natural graphite such as flake graphite, massive graphite, and amorphous graphite; and an artificial graphite such as massive artificial graphite (MAG) and graphitized mesophase-carbon microbead (MCMB). For the negative electrode active material, a Si-based active material composed of at least one of Si and a Si-containing compound may also be used, and the carbon-based active material and the Si-based active material may be used in combination.

For the binder included in the negative electrode mixture layer, a fluororesin, PAN, a polyimide, an acrylic resin, a polyolefin, and the like may be used similar to that in the positive electrode 11, but styrene-butadiene rubber (SBR) is preferably used. The negative electrode mixture layer preferably further includes CMC or a salt thereof, polyacrylic acid (PAA) or a salt thereof, polyvinyl alcohol (PVA), and the like. Among them, SBR; and CMC or a salt thereof, or PAA or a salt thereof are preferably used in combination.

[Separator]

For the separator 13, a porous sheet having an ion permeation property and an insulation property is used. Specific examples of the porous sheet include a fine porous thin film, a woven fabric, and a nonwoven fabric. As a material for the separator 13, a polyolefin such as polyethylene and polypropylene, cellulose, and the like are preferable. The separator 13 may have any of a single-layered structure and a multilayered structure. On a surface of the separator, a heat-resistant layer and the like may be formed.

EXAMPLES

Hereinafter, the present disclosure will be further described with Examples, but the present disclosure is not limited to these Examples.

Example 1

[Synthesis of Lithium-Transition Metal Composite Oxide (Positive Electrode Active Material)]

A metal composite oxide represented by the general formula $Ni_{0.87}Co_{0.06}Al_{0.03}Fe_{0.04}O_2$ and calcium hydroxide ($Ca(OH)_2$) were mixed so that a Ca content was 1.0 mol % based on a total amount of Ni, Co, Al, and Fe in the metal composite oxide, and then lithium hydroxide monohydrate ($LiOH \cdot H_2O$) was mixed so that a molar ratio of the total amount of Ni, Co, Al, Fe, and Ca to Li was 1:1.02. The mixture was calcined under an oxygen flow of an oxygen concentration of 95% (a flow rate of 5 L/min per 1 kg of the mixture) at a heating rate of 2.0° C./min from a room temperature to 650° C. Then, the mixture was calcined at a heating rate of 1° C./min from 650° C. to 780° C. The calcined product was washed with water for removing an impurity to obtain a lithium-transition metal composite oxide. A composition of the lithium-transition metal composite oxide was analyzed with ICP-AES, and was $Li_{0.99}Ni_{0.86}Co_{0.06}Al_{0.03}Fe_{0.04}Ca_{0.01}O_2$.

[Production of Positive Electrode]

The above lithium-transition metal composite oxide was used as the positive electrode active material. The positive electrode active material, acetylene black, and polyvinylidene fluoride (PVdF) were mixed at a solid-content mass ratio of 95:3:2, an appropriate amount of N-methyl-2-pyrrolidone (NMP) was added, and then the mixture was kneaded to prepare a positive electrode mixture slurry. This positive electrode mixture slurry was applied on both surfaces of a positive electrode core made of aluminum foil, the applied film was dried, and then rolled using a roller and cut to a predetermined electrode size to obtain a positive electrode in which the positive electrode mixture layer was formed on both the surfaces of the positive electrode core. An exposed part where a surface of the positive electrode core was exposed was provided at a part of the positive electrode.

[Preparation of Non-Aqueous Electrolyte]

Into a mixed solvent of ethylene carbonate (EC), methyl ethyl carbonate (MEC), and dimethyl carbonate (DMC) at a volume ratio of 3:3:4, lithium hexafluorophosphate ($LiPF_6$) was dissolved at a concentration of 1.2 mol/litter to prepare a non-aqueous electrolyte liquid.

[Production of Test Cell (Non-Aqueous Electrolyte Secondary Battery)]

An aluminum lead was attached to the exposed part of the positive electrode, a nickel lead was attached to the lithium metal foil as the negative electrode, and the positive electrode and the negative electrode were spirally wound with a separator made of polyolefin interposed therebetween and then press-formed in the radial direction to produce a flat, wound electrode assembly. This electrode assembly was housed in an exterior housing body composed of an aluminum laminated sheet, the above non-aqueous electrolyte liquid was injected thereinto, and an opening of the exterior housing body was sealed to obtain a test cell.

On the lithium-transition metal composite oxide, a proportion of the metal elements other than Li in the Li layer was evaluated by the following method. On the test cell, each charge-discharge cycle characteristic was evaluated by the following method. The evaluation results are shown in Table 2 (the same applies to Examples and Comparative Examples, described below). Table 2 also shows the metal elements other than Li constituting the lithium-transition metal composite oxide and the content thereof [(number of moles of each metal element total number of moles of metal elements excluding Li)×100].

[Proportion of Metal Elements Other Than Li in Li Layer of Lithium-Transition Metal Composite Oxide]

The proportion of the metal elements other than Li in the Li layer is determined by Rietveld analysis of an X-ray diffraction pattern obtained by X-ray diffraction measurement of the lithium-transition metal composite oxide. The X-ray diffraction pattern is obtained by powder X-ray diffraction method using a powder X-ray diffraction apparatus (manufactured by Rigaku Corporation, product name "RINT-TTR", radiation source Cu-Kα) and with the following conditions:

Measuring Range: 15-120°
Scanning Rate: 4°/min
Analyzing Range: 30-120°
Background: B-spline
Profile Function: Split pseudo-Voigt function
Restricting Condition: Li(3a)+Ni(3a)=1
Ni(3a)+Ni(3b)=y (y represents each Ni content ratio)
ICSD No.: 98-009-4814

For the Rietveld analysis of the X-ray diffraction pattern, PDXL2 (manufactured by Rigaku Corporation), which is a software for Rietveld analysis, is used.

[Evaluation of Charge-Discharge Cycle Characteristics (Capacity Maintenance Rate After Cycle Test)]

The test cell was charged at a constant current of 0.2 It until a battery voltage reached 4.2 V under a temperature environment of 25° C., and charged at a constant voltage of 4.2 V until a current value reached 1/100 It. Then, the test cell was discharged at a constant current of 0.2 It until a battery voltage reached 2.5 V. This charge-discharge cycle was repeated 30 times. In the cycle test, a discharge capacity at the 1st cycle and a discharge capacity at the 30th cycle were determined, and the capacity maintenance rate was calculated with the following formula.

Capacity Maintenance Rate (%)=(Discharge Capacity at 30th Cycle/Discharge Capacity at 1st Cycle)×100

Examples 2 to 9

Each test cell was produced and evaluated in the same manner as in Example 1 except that: the raw materials used and the mixing ratio of the raw materials were changed to synthesize a lithium-transition metal composite oxide having a composition shown in Table 2; in Example 3, the mixture was calcined under an oxygen flow with a flow rate of 10 L/min per 1 kg of the mixture at a heating rate of 2.0° C./min from a room temperature to 650° C., and then calcined at a heating rate of 1° C./min from 650° C. to 720° C.; in Example 4, the mixture was calcined at a heating rate of 3.0° C./min from a room temperature to 670° C., and then calcined at a heating rate of 1° C./min from 670° C. to 720° C.; in Example 5, the mixture was calcined at a heating rate of 2.0° C./min from a room temperature to 650° C., and then calcined at a heating rate of 1° C./min from 650° C. to 750° C.; and in Examples 7, Example 8, and Example 9, the mixture was calcined at a heating rate of 2.0° C./min from a room temperature to 650° C., and then calcined at a heating rate of 0.5° C./min from 650° C. to 700° C.

Comparative Examples 1 to 7

Each test cell was produced and evaluated in the same manner as in Example 1 except that: the raw materials used and the mixing ratio of the raw materials were changed to synthesize a lithium-transition metal composite oxide having a composition shown in Table 2; in Comparative Example 4 and Comparative Example 5, the mixture was calcined at a heating rate of 3.0° C./min from a room temperature to 650° C., and then calcined at a heating rate of 1° C./min from 650° C. to 720° C.; and in Comparative Example 6 and Comparative Example 7, the mixture was calcined at a heating rate of 2.0° C./min from a room temperature to 650° C., and then calcined at a heating rate of 0.5° C./min from 650° C. to 700° C.

Figure 2:
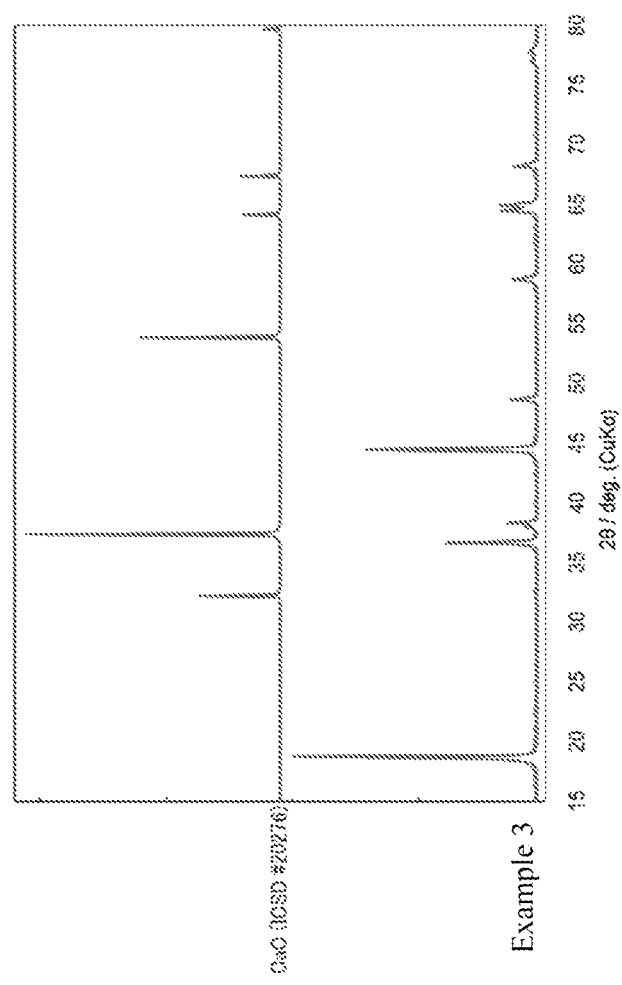
FIG. 2 is an X-ray diffraction pattern of a positive electrode active material in Example 3.

On the lithium-transition metal composite oxide (positive electrode active material) in Examples and Comparative Examples, a powder X-ray diffraction measurement was performed under the above conditions to obtain an X-ray diffraction pattern. In all of the X-ray diffraction patterns in Examples and Comparative Examples, diffraction lines indicating a layered structure were observed, and no peak of CaO was observed. As an example, an X-ray diffraction pattern of the positive electrode active material in Example 3 is shown in FIG. 2. From each of the X-ray diffraction patterns in Examples and Comparative Examples, a proportion of the metal elements other than Li, a lattice constant a, a lattice constant c, and a crystallite size S were determined. The results are summarized in Table 1.

TABLE 1

|  | Lattice constant a (Å) | Lattice constant c (Å) | Crystallite size S (Å) |
| --- | --- | --- | --- |
| Example 1 | 2.870 | 14.19 | 832 |
| Example 2 | 2.878 | 14.21 | 787 |
| Example 3 | 2.871 | 14.20 | 687 |
| Example 4 | 2.871 | 14.19 | 534 |
| Example 5 | 2.874 | 14.20 | 748 |
| Example 6 | 2.S71 | 14.20 | 635 |
| Example 7 | 2.873 | 14.20 | 503 |
| Example 8 | 2 879 | 14.20 | 591 |
| Example 9 | 2.878 | 14.22 | 488 |
| Comparative Example 1 | 2.873 | 14.19 | 771 |
| Comparative Example 2 | 2.869 | 14.20 | 815 |
| Comparative Example 3 | 2.878 | 14.20 | 749 |
| Comparative Example 4 | 2.871 | 14.19 | 635 |
| Comparative Example 5 | 2.874 | 14.20 | 679 |
| Comparative Example 6 | 2.875 | 14.21 | 535 |
| Comparative Example 7 | 2.874 | 14.20 | 563 |

TABLE 2

| | Positive electrode active material | | | | Evaluation of battery | |
| --- | --- | --- | --- | --- | --- | --- |
| | Ni | Al | Ca | Me | M in Li layer | performance Capacity maintenance rate/% |
| Example 1 | 86.0 | 3.0 | 1.0 | Co6.0, Fe4.0 | 1.0% | 92.7 |
| Example 2 | 88.5 | 3.0 | 1.5 | Co0.5, Mn6.5 | 1.7% | 90.4 |
| Example 3 | 89.9 | 5.0 | 0.1 | Co5.0 | 0.9% | 94.1 |
| Example 4 | 89.0 | 5.0 | 0.5 | Co5.0, Si0.5 | 0.9% | 93.9 |
| Example 5 | 89.4 | 3.0 | 0.1 | Co0.5, Mn6.5, Nb0.5 | 1.8% | 93.9 |
| Example 6 | 90.0 | 3.0 | 1.0 | Co6.0 | 1.0% | 93.6 |
| Example 7 | 92.0 | 4.0 | 1.0 | Mn2.0, Ti1.0 | 1.5% | 92.1 |
| Example 8 | 92.5 | 4.0 | 1.5 | Mn2.0 | 1.7% | 91.8 |
| Example 9 | 93.9 | 4.0 | 0.1 | Mn2.0 | 1.3% | 90.4 |
| Comparative Example 1 | 86.0 | — | 1.0 | Co8.0, Mn5.0 | 1.0% | 87.7 |
| Comparative Example 2 | 88.0 | 3.0 | 3.0 | Co6.0 | 0.9% | 79.3 |
| Comparative Example 3 | 89.0 | 3.0 | 1.0 | Co0.5, Mn6.5 | 2.5% | 88.4 |

TABLE 2-continued

| | Positive electrode active material | | | | | Evaluation of battery |
|---|---|---|---|---|---|---|
| | Ni | Al | Ca | Me | M in Li layer | performance Capacity maintenance rate/% |
| Comparative Example 4 | 90.0 | 5.0 | — | Co5.0 | 1.0% | 88.7 |
| Comparative Example 5 | 90.0 | 3.0 | 1.0 | Co6.0 | 0.5% | 89.0 |
| Comparative Example 6 | 92.0 | 4.0 | — | Mn2.0, Nb0.5, Sr1.5 | 1.9% | 85.6 |
| Comparative Example 7 | 93.5 | 4.0 | — | Mn2.0, Mg0.5 | 1.7% | 85.8 |

As shown in Table 2, any of the test cells in Examples has a higher capacity maintenance rate after the cycle test than the test cells in Comparative Examples, and has excellent charge-discharge cycle characteristics. When no Ca is contained in the positive electrode active material (Comparative Examples 4, 6, and 7), the discharge capacity after the cycle test is much lowered. Even with containing Ca in the positive electrode active material, when no Al is contained (Comparative Example 1), when the proportion of the metal elements other than Li in the Li layer is out of the range of 0.6 to 2.0 mol % (Comparative Examples 3 and 5), and when the Ca content is more than 2 mol % (Comparative Example 2), the discharge capacity after the cycle test is also much lowered. In other words, a specific synergistic effect is exerted only when the specific amounts of Al and Ca are contained and the specific amount of the metal elements other than Li are present in the Li layer, resulting in a remarkable improvement in the charge-discharge cycle characteristics of the battery.

REFERENCE SIGNS LIST

10 Secondary battery
11 Positive electrode
12 Negative electrode
13 Separator
14 Electrode assembly
16 Exterior housing can
17 Sealing assembly
18, 19 Insulating plate
20 Positive electrode lead
21 Negative electrode lead
22 Grooved part
23 Internal terminal plate
24 Lower vent member
25 Insulating member
26 Upper vent member
27 Cap
28 Gasket

The invention claimed is:

1. A positive electrode active material for a non-aqueous electrolyte secondary battery, including:
a lithium-transition metal composite oxide having a layered structure and containing at least Ni, Al, and Ca, wherein
the lithium-transition metal composite oxide is represented by a general formula $Li_aNi_bCo_cAl_dMn_eCa_fM_gO_h$ (where $0.8 \leq a \leq 1.2$, $0.85 \leq b \leq 0.95$, $0 \leq c \leq 0.06$, $0 < d \leq 0.08$, $0 \leq e \leq 0.10$, $0 < f \leq 0.02$, $0 \leq g \leq 0.10$, $1 \leq h \leq 2$, $b+c+d+e+f+g=1$, M is at least one selected from the group consisting of Fe, Ti, Si, Nb, Zr, Mo, and Zn),
in the lithium-transition metal composite oxide,
a proportion of metal elements other than Li present in a Li layer is 0.6 to 2.0 mol % based on a total number of moles of metal elements excluding Li contained in the composite oxide.

2. The positive electrode active material for a non-aqueous electrolyte secondary battery according to claim 1, wherein the lithium-transition metal composite oxide contains at least one metal element selected from the group consisting of Co, Mn, Fe, Ti, Si, Nb, Zr, Mo, and Zn at an amount of 15 mol % or less based on the total number of moles of metal elements excluding Li.

3. The positive electrode active material for a non-aqueous electrolyte secondary battery according to claim 1, wherein the lithium-transition metal composite oxide is of secondary particles formed by aggregation of a plurality of primary particles, and Ca is present on a surface of the primary particles including a surface of the secondary particles and near the surface of the primary particles at a higher concentration than a central part of the primary particles.

4. The positive electrode active material for a non-aqueous electrolyte secondary battery according to claim 1, wherein the lithium-transition metal composite oxide has a crystallite size of 400 to 800 Å, the crystallite size being calculated with Scherrer equation from a half-value width of a diffraction peak of a (104) surface in an X-ray diffraction pattern obtained by X-ray diffraction measurement.

5. The positive electrode active material for a non-aqueous electrolyte secondary battery according to claim 1, wherein the lithium-transition metal composite oxide has a lattice constant a indicating an a-axis length of a crystal structure of 2.870 Å $\leq a \leq$ 2.877 Å and a lattice constant c indicating a c-axis length of 14.18 Å $\leq c \leq$ 14.21 Å.

6. The positive electrode active material for a non-aqueous electrolyte secondary battery according to claim 1, wherein an X-ray diffraction pattern obtained by X-ray diffraction measurement of the lithium-transition metal composite oxide has no peak derived from CaO.

7. A non-aqueous electrolyte secondary battery, comprising:
a positive electrode including the positive electrode active material for a non-aqueous electrolyte secondary battery according to claim 1;
a negative electrode; and
a non-aqueous electrolyte.

* * * * *